(12) United States Patent
Vellanki et al.

(10) Patent No.: US 8,374,623 B2
(45) Date of Patent: Feb. 12, 2013

(54) LOCATION BASED, SOFTWARE CONTROL OF MOBILE DEVICES

(75) Inventors: Vivekanand Vellanki, Andhra Pradesh (IN); Durga Devi, Hyderabad, A.P. (IN)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/459,132

(22) Filed: Jul. 21, 2006

(65) Prior Publication Data

US 2008/0019317 A1   Jan. 24, 2008

(51) Int. Cl.
*H04W 24/00* (2009.01)

(52) U.S. Cl. ............. 455/456.1; 455/456.5; 455/456.6

(58) Field of Classification Search .......... 455/435.2, 455/437, 436, 453, 456.1–456.6, 404.2, 525; 370/331–334, 310
See application file for complete search history.

(56) References Cited

U.S. PATENT DOCUMENTS

| | | | |
|---|---|---|---|
| 5,442,805 A | 8/1995 | Sagers et al. | |
| 5,857,155 A | 1/1999 | Hill et al. | |
| 6,011,973 A | 1/2000 | Valentine et al. | |
| 6,327,535 B1 | 12/2001 | Evans et al. | |
| 6,347,224 B1* | 2/2002 | Smyth et al. | 455/406 |
| 6,832,093 B1* | 12/2004 | Ranta | 455/456.4 |
| 6,909,903 B2 | 6/2005 | Wang | |
| 6,944,679 B2 | 9/2005 | Parupudi et al. | |
| 7,026,983 B2* | 4/2006 | Spratt | 342/357.09 |
| 7,171,218 B2* | 1/2007 | Ikeda et al. | 455/456.1 |
| 7,308,263 B2* | 12/2007 | Gallagher et al. | 455/439 |
| 2001/0055974 A1* | 12/2001 | Bates et al. | 455/456 |
| 2002/0123373 A1 | 9/2002 | Kirbas et al. | |
| 2003/0013449 A1* | 1/2003 | Hose et al. | 455/440 |
| 2003/0040314 A1* | 2/2003 | Hogan et al. | 455/435 |
| 2003/0104824 A1* | 6/2003 | Hale et al. | 455/456 |
| 2004/0014474 A1 | 1/2004 | Kanada | |
| 2004/0063431 A1* | 4/2004 | Julka et al. | 455/436 |
| 2004/0132462 A1* | 7/2004 | Bonnard et al. | 455/456.1 |
| 2004/0203667 A1* | 10/2004 | Schroeder et al. | 455/414.1 |
| 2005/0048972 A1* | 3/2005 | Dorenbosch et al. | 455/436 |
| 2005/0053034 A1 | 3/2005 | Chiueh | |
| 2005/0080800 A1 | 4/2005 | Parupudi et al. | |
| 2005/0153705 A1* | 7/2005 | Gramakov et al. | 455/456.1 |
| 2005/0195777 A1 | 9/2005 | Green | |
| 2005/0197768 A1 | 9/2005 | Kaikuranta et al. | |

(Continued)

FOREIGN PATENT DOCUMENTS

| | | |
|---|---|---|
| CN | 1486103 A | 3/2004 |
| CN | 1698288 A | 11/2005 |

(Continued)

OTHER PUBLICATIONS

International Search Report dated Nov. 14, 2007 in International Application No. PCT/US2007/074143 filed Jul. 23, 2007.

(Continued)

*Primary Examiner* — Ajit Patel
(74) *Attorney, Agent, or Firm* — Vierra Magen Marcus & DeNiro LLP

(57) ABSTRACT

Methods are disclosed for controlling mobile computing devices such as laptops, PDAs and cellular telephones, based on their location. A mobile computing device may include a software-rendered map of defined geographic regions, location handlers for defining behavior of a mobile device in a given geographic region, and a location handling engine for determining when a new geographic zone has been entered and exited, and for executing and terminating location handlers accordingly.

15 Claims, 3 Drawing Sheets

U.S. PATENT DOCUMENTS

| | | | |
|---|---|---|---|
| 2006/0034222 | A1 | 2/2006 | Chennikara-Varghese et al. |
| 2006/0068777 | A1 | 3/2006 | Sadowsky et al. |
| 2006/0077938 | A1 | 4/2006 | Alapuranen |
| 2006/0084445 | A1* | 4/2006 | Minami et al. ............. 455/452.1 |
| 2007/0191054 | A1* | 8/2007 | Das et al. ...................... 455/525 |

FOREIGN PATENT DOCUMENTS

| | | |
|---|---|---|
| EP | 1460873 A1 | 9/2004 |
| GB | 2362786 A | 11/2001 |

OTHER PUBLICATIONS

Pfeifer et al., "Mobile Guide—Location—Aware Applications from the Lab to the Market", Technical University of Berlin, 5th Int. Workshop on Interactive Distributed Multimedia Systems and Telecommunicaton Service, IDMS'98, Sep. 8-11, 1998; http://www.tssg.org/people/tpfeifer/publish/idms98.springer15int.pdf.

Hewlett Packard Development Company, L.P. Copyright 2006, "HP Broadband Wireless notebooks: integrated high-speed wireless connectivity", White paper; http://www.hp.com/sbso/wireless/hp_broadbad_wireless_notebooks.pdf.

Zerfos et al., "DIRAC: A Software-based Wireless Router System", MobiCom'03, Sep. 14-19, 2003; http://www-faculty.cs.uiuc.edu/~haiyun/publications/MOBICOM03-DIRAC.pdf.

Office Action dated Oct. 25, 2010, Chinese Patent Application No. 200780027422.6.

Partial English Translation of Office Action dated Oct. 25, 2010, Chinese Patent Application No. 200780027422.6.

English Abstract of CN1698288 published Nov. 16, 2005.

English Abstract of CN1486103 published Mar. 31, 2004.

* cited by examiner

LOCATION BASED, SOFTWARE CONTROL OF MOBILE DEVICES

BACKGROUND

Computing devices have been miniaturized and mobilized to the point where many individuals have one or more of a laptop, personal digital assistant (PDA) and/or a smart phone with them at all times. The ubiquitous nature of mobile computing devices have given rise to several rules and restrictions as to where and how such devices may be used. For example, the radio transmission and wireless networking capabilities of a mobile device may be limited to certain frequencies or prohibited altogether in certain areas in order to comply with local laws. As another example, certain locations require muting of the device volume, disabling of the image capture capabilities of the device and/or turning the device off altogether. It is therefore necessary or desirable to configure hardware of a mobile computing device to comply with whatever restrictions may apply in the geographic location in which the mobile computing device is located.

Moreover, various wireless networks have been developed which allow individuals to user their mobile devices to stay connected with a network almost anywhere they may find themselves. Such wireless networks include for example wireless personal area networks (WPANs), wireless local area networks (WLANs), wireless metropolitan area networks (WiMax or WMANs), and wireless wide area networks (WWANs). Each of these networks may operate according to different protocols, and may employ different hardware within a computing device for connectivity. As an individual travels between different geographic areas, the user may wish or need to connect to different networks. For example, the user may connect to a WWAN while traveling, but may connect to a speedier and more secure WLAN at home or work. Mobile devices have grown in sophistication so as to include the hardware able to access different networks in different geographic areas. However, hardware configuration is required in order to change between different networks.

It is well known that devices may be location aware. Software and hardware global positioning systems and the like are well known for providing location information to a mobile computing device. It is also known to automatically configure certain software applications running on a mobile computing device based on the identifiable position of a mobile computing device. For example, U.S. Pat. No. 6,944,679 entitled, "Context-Aware Systems and Methods, Location-Aware Systems and Methods, Context-Aware Vehicles and Methods of Operating the Same, and Location-Aware Vehicles and Methods of Operating the Same," assigned to the owner of the present application, discloses a system capable of determining the position of a mobile computing device, and then modifying the behavior of one or more software applications running on the device based on the location information.

SUMMARY

Embodiments of the present system in general relate to methods for controlling mobile devices, such as laptops, PDAs and cellular telephones, based on their location. A mobile computing device may include a software-rendered map of defined geographic regions, location handlers for defining behavior of a mobile device in a given geographic region, and a location handling engine for determining when a new geographic zone has been entered and exited, and for executing and terminating location handlers accordingly.

The geographic map includes one or more geographic regions, or zones, in which the behavior of the mobile computing device is to be controlled. In one embodiment, the geographic zones may be polygons defined by coordinate vertices in a two dimensional plane, where lines between the coordinate vertices define the shape of the zone. Any number of vertices for a given geographic zone may be selected and stored in memory to define the zone in any of a variety of different polygon shapes. There may also be any number of such geographic zones defined on the geographic map. Two or more defined geographic zones may have portions which overlap, including a partial overlap or a complete overlap, where a first geographic zone may be completely encompassed within a second geographic zone.

One or more software instructions for controlling the behavior of a given mobile computing device may be created and stored for each geographic zone on the geographic map. The software instructions, referred to herein as location handlers, may be associated in memory with each geographic zone defined on the map so that when a mobile computing device crosses into a geographic zone, the location handlers for that specific geographic zone may be executed. The location handlers for a given mobile computing device interact with the device's operating system to initiate, terminate and/or alter any of a variety of system settings on the device.

For example, in an embodiment, location handlers may be provided for controlling wireless network connections for a mobile computing device based on a location of the device. Location handlers may be provided for establishing a connection with any of a variety of wireless networks, such as for example a WWAN, WLAN, WiMax and WPAN. A mobile computing device may include location handlers which cause the device to connect to a first network when in a first geographic zone, to connect to a second network when in a second geographic zone, to connect to a third network when in a third geographic zone, etc.

The location handlers may also be used to alter other system settings. There may be instances where radio transmission on a particular frequency in a given geographic area is prohibited. Accordingly, geographic zones where such restrictions exist may be defined on the map, and location handlers defined to turn off radio transmission on the designated frequencies, or turn off radio transmission altogether. In a further aspect of the present system, geographic zones and associated location handlers may be defined to control the multimedia properties of a mobile computing device, such as for example volume, photo and video capture and device display. Location handlers may also be provided on a device which power down the device altogether upon entry into a defined geographic zone.

The geographic map and location handlers may be stored in memory on a mobile computing device. Alternatively, the geographic map and/or location handlers may be stored centrally on a server to which mobile devices may be network connected. In such an embodiment, upon entry into a geographic zone, the device may access the server, and then download and execute the location handlers for that zone. For example, in Windows® operating system devices, the location handlers may be associated with a group policy. Such an embodiment has an advantage of centralized management of devices, in that a network administrator may quickly and easily add, delete and/or modify one or more location handlers for a plurality of mobile computing devices. Policies may be set up so that different users of a given device receive different location handlers, based on any number of criteria.

The location handling engine may be provided for determining when a new geographic zone has been entered and exited, and for executing and terminating location handlers accordingly. The location handling engine may be stored in memory of the mobile computing device. Upon a determination by the location handling engine that a mobile computing device has crossed a boundary into a geographic zone, the location handlers for that zone may be executed. Similarly, upon a determination by the location handling engine that a mobile computing device has crossed a boundary out of a geographic zone, the location handlers for that zone may be stopped or reversed.

DETAILED DESCRIPTION

Figure 1:
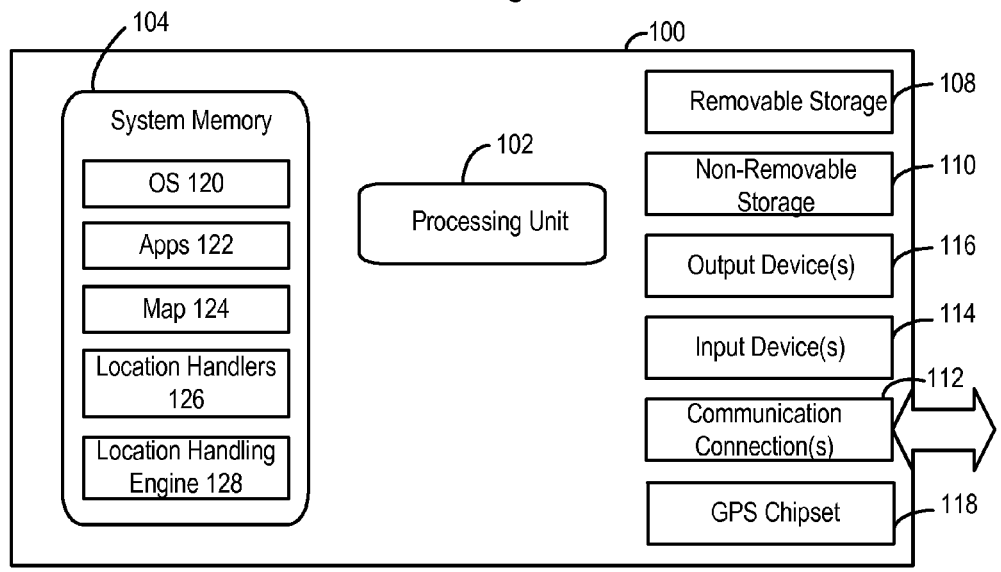
FIG. 1 is block diagram of a mobile computing device including a system for controlling the device based on location.

Embodiments of the present system will now be described with reference to FIGS. 1-5 which in general relate to methods for controlling mobile devices based on their location. As explained hereinafter, the present invention may operate with a variety of mobile computing devices. FIG. 1 is an illustration of a computing environment configured as a laptop, a handheld computer or computer which may be incorporated into a moving vehicle such as a car, bicycle, train, airplane, boat or other moving structure. The mobile computing device shown in FIG. 1 is only one example of a suitable operating environment and is not intended to suggest any limitation as to the scope of use or functionality of the invention. Other known mobile computing systems, environments, and/or configurations that may be suitable for use with the present system include, but are not limited to, PDAs, cellular telephones, multiprocessor systems, microprocessor-based systems, programmable consumer electronics, minicomputers, distributed computing environments that include any of the above systems or devices, and the like.

With reference to FIG. 1, an exemplary system for implementing the invention includes a mobile computing device, such as mobile computing device 100. In a basic configuration, mobile computing device 100 may include at least one processing unit 102 and memory 104. Depending on the exact configuration and type of computing device, memory 104 may be volatile (such as RAM), non-volatile (such as ROM, flash memory, etc.) or some combination of the two. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110.

Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

An operating system 120 may be resident in the memory 104 and executes on the processor 102. The operating system may for example be the Windows® operating system from Microsoft Corporation or other operating system. One or more application programs 122 may be loaded into memory 104 and run on the operating system 120. Examples of applications include email programs, scheduling programs, PIM (personal information management) programs, word processing programs, spreadsheet programs, Internet browser programs, and so forth.

Moreover, memory 104 may further include a system for controlling the mobile computing device based on its location as explained hereinafter. The present system may include a software-rendered map 124 of defined geographic regions, location handlers 126 for defining behavior of a mobile device in a given geographic region, and a location handling engine 128 for determining when a new geographic region has been entered and exited, and for executing and terminating location handlers accordingly. While the map 124, location handlers 126 and location handling engine 128 are shown as separate modules, it is understood that two or more of these modules may be combined together. For example, the location handlers 126 may be combined as part of location handling engine 128. Each of the map 124, location handlers 126 and location handling engine 128 according to the present system are explained in greater detail hereinafter.

Mobile computing device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here. As explained hereinafter, mobile computing device 100 may further include a location identification system, such as global positioning system chipset 118.

Those of skill in the art would appreciate that many modifications, substitutions and/or additions may be made to the mobile computing device 100 shown in FIG. 1.

The present system works in conjunction with a location identification system of known construction for identifying a location of the mobile device. For example, mobile computing devices such as laptops, PDAs, cellular telephones and computers in vehicles may include a global positioning system (GPS) chipset 118 as shown in FIG. 1. The chipset includes a receiver for receiving timing signals from a network of GPS satellites orbiting the Earth which allow the chipset to accurately determine its position (longitude, latitude and altitude).

It is understood that other known location identification systems may be used in conjunction with the present system. Another class of wide-area location technology is provided by wireless phone service companies, and uses cell tower observations of cell phones and other mobile devices to estimate the device's location. There are also several location identification systems adapted for use in smaller areas, such as for example Microsoft Research's RADAR system. Microsoft's RADAR uses 802.11 LAN wireless networking technology, which allows wireless (LAN)-enabled mobile devices to compute locations based on signal strengths of known infrastructure access points (APs). Other location identification technologies are contemplated. It is understood that in embodiments of the present system, the location identification system need not have the capability to precisely identify the position of the mobile device. For example, in embodiments, location to within the nearest 100 feet may be sufficient. The precision of the location identification device may be greater than that or less than that in alternative embodiments.

Figure 2:
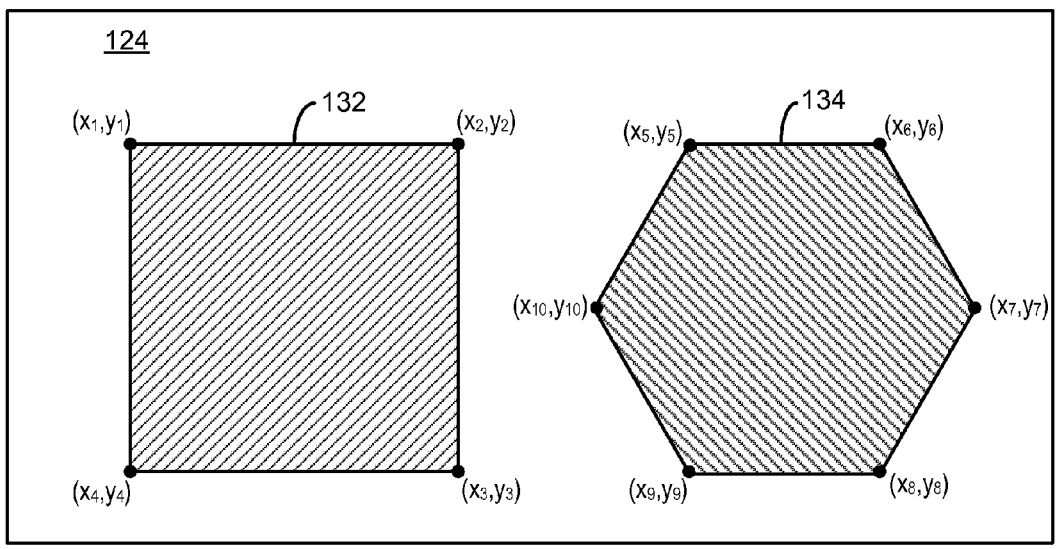
FIG. 2 is a schematic representation of a geographic map according to the present system.

An aspect of the present system involves the creation and storage in memory of a geographic map 124. Map 124 includes one or more geographic regions, or zones, in which the behavior of the mobile computing device is to be controlled. In one embodiment, the geographic zones may be polygons defined by coordinate vertices in a two dimensional plane, where lines between the coordinate vertices define the shape of the zone. For example, FIG. 2 shows a geographic map 124 including a pair of geographic zones 132 and 134. As shown in FIG. 2, each zone may be defined by a plurality of vertices $(x_i, y_i)$, with each vertices representing a particular geographic point on map 124. A first set of the vertices, for example $(x_1, y_1)$ through $(x_4, y_4)$ may be designated in memory as defining first geographic zone 132, and a second set of vertices, for example $(x_5, y_5)$ through $(x_{10}, y_{10})$ may be designated in memory as defining second geographic zone 134. There may be any number of such geographic zones defined on the geographic map according to embodiments of the present system.

The vertices of each polygon zone may be stored in memory as symbolic values on a Cartesian plane. For example, the coordinates $(x_1, y_1)$ through $(x_4, y_4)$ may be stored as (0,0), (0,1), (1,1) and (1,0), respectively. Each symbolic vertex could then be mapped to an actual real world geographic point on the Earth using a look-up table stored in association with the vertices. Alternatively, the vertices may have actual longitude and latitude values.

The order with which the coordinates are stored may define the shape of each given geographic zone. For example, the set of vertices (0,0), (1,0), (1,1), (0,1), (0,0) would represent an area with lines from:
  (0,0) to (1,0)
  (1,0) to (1,1)
  (1,1) to (0,1)
  (0,1) to (0,0)
Such a geographic zone would be a square as shown in FIG. 2. On the other hand, the set of vertices (0,0), (1,0), (0,1), (1,1), (0,0) would represent an area with lines from:
  (0,0) to (1,0)
  (1,0) to (0,1)
  (0,1) to (1,1)
  (1,1) to (0,0)
Such a geographic zone would be a pair of triangles joined at their respective apexes.

Figure 3:
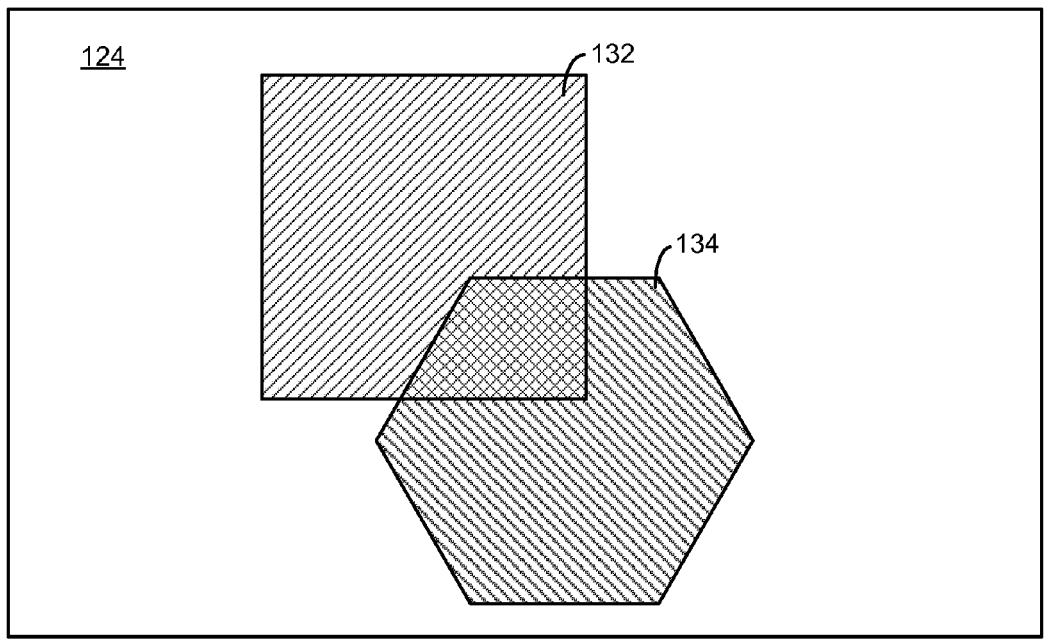
FIG. 3 is a schematic representation of an alternative geographic map according to the present system.
Figure 4:
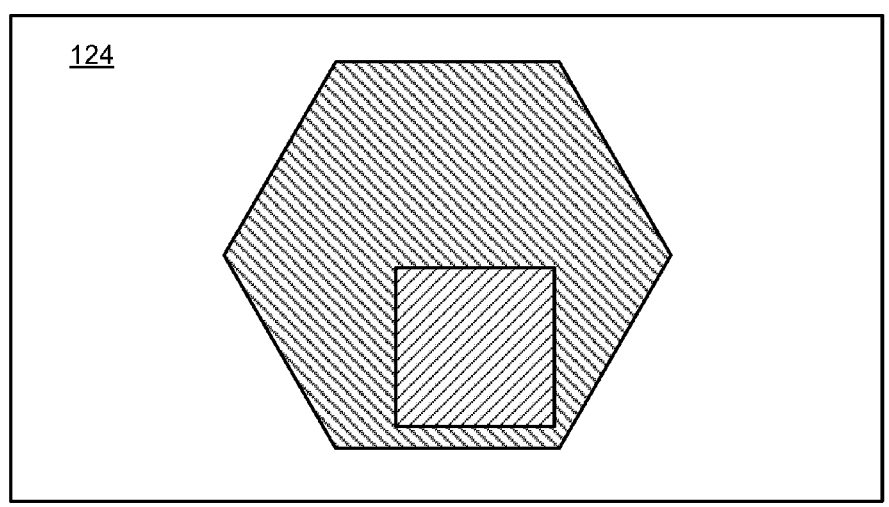
FIG. 4 is a schematic representation of an alternative geographic map according to the present system.
Figure 5:
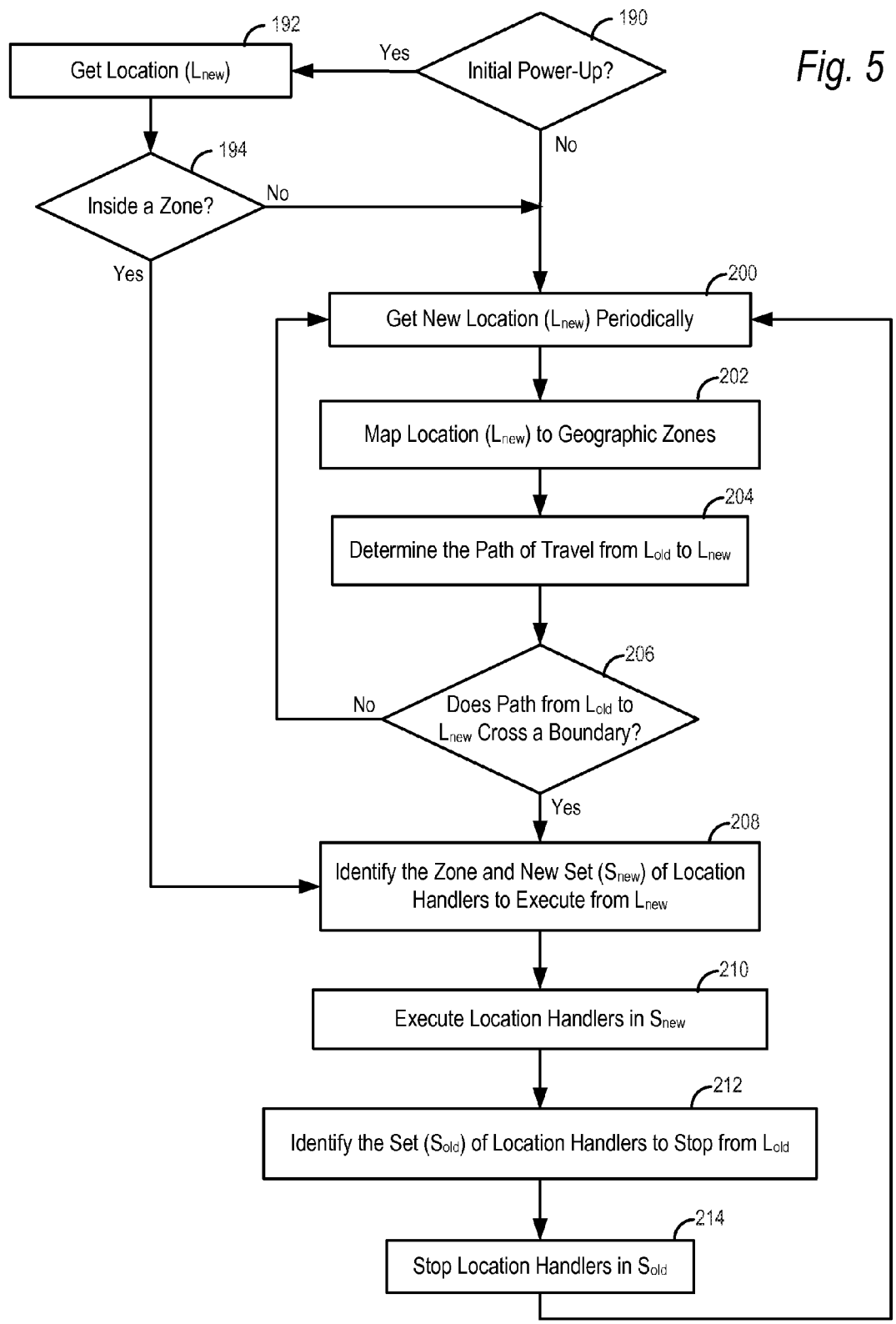
FIG. 5 is a flowchart for determining when a geographic zone has been entered and exited, and for executing and terminating location handlers accordingly.

It is understood that any number of vertices for a given geographic zone may be selected and stored to define the zone in any of a variety of different polygon shapes. Moreover, it is contemplated that two or more defined geographic zones may have portions which overlap. The overlap may be partial as shown in FIG. 3, or the overlap may be complete, as shown in FIG. 4.

A geographic map 124 may be uniquely created for each mobile computing device. Alternatively, two or more mobile computing devices may share the same geographic map. The geographic map 124 including one or more geographic zones may be generated, for example by a user or an IT administrator, and then stored in memory on a mobile computing device. Alternatively, a geographic map 124 may be stored remotely from a mobile computing device, and downloaded to the mobile computing device via a portable memory, or via a network connection such as for example the Internet.

A map 124 may be set up via the user interface on the mobile computing device, or by an administrator using a different computing device. In one embodiment for setting up the map 124, one or more real world geographical maps may be presented to the user/administrator, and the user/administrator may use a mouse to select points on the real world map. Those points may then be translated into symbolic coordinates and stored with an association to the real world coordinates as described above, or they may be stored as the real world coordinates (longitude and latitude) as described above.

It is understood that the above description relates to one embodiment for generating a geographic map 124. It is understood that one or more geographic zones for which the behavior of the mobile computing device are controlled may be generated by a variety of other known methods in alternative embodiments of the present system.

In accordance with a further aspect of the present system, one or more software instructions for controlling the behavior of a given mobile computing device 100 may be created and stored for each geographic zone on map 124. One ore more software instructions, referred to herein as location handlers 126, may be associated in memory with each geographic zone defined on map 124. When a mobile computing device crosses into a geographic zone, the location handlers for that specific geographic zone may be executed. Each mobile computing device 100 may have location handlers 126 that are customized for that particular computing device. However, two or more mobile computing devices may have the same location handlers in embodiments of the present system. Where two mobile computing devices share the same geographic map, the location handlers for those two devices may be the same as each other or different from each other.

The location handlers 126 for a given mobile computing device 100 specify the behavior of the mobile device upon entry into a given geographic zone designated on map 124. The method according to the present system for determining when a mobile computing device enters or exits a particular geographic zone will be explained hereinafter in greater detail. Operating system application programming interfaces (APIs) allow the location handlers 126 to interact with a device's operating system to initiate, terminate and/or alter any of a variety of system settings on the device.

For example, in an embodiment, location handlers 126 may be provided for controlling wireless network connections for a mobile computing device 100 based on a location of the device. As indicated in the Background section, mobile computing devices currently have the sophistication to connect to several different wireless networks, including for example WWAN, WLAN, WiMax and WPAN. A mobile computing device 100 may include location handlers 126 which cause the device to connect to a first network, for example a WWAN, when in a first geographic zone, and to connect to a second network, for example a WLAN, when in a second geographic zone. Any number of different network connections may be defined for different geographic zones.

The actual syntax of a location handler 126 for connecting to a specific wireless network upon entry into a specific geographic zone will vary depending on the type of mobile computing device executing the location handler. For example, in a laptop computer (or computer in a vehicle), one or more wireless networking options may exist. A user may set up a connection to a WLAN in a known manner, for example specifying an SSID and security options. A user may also set up a connection to a WWAN via a wireless service provider. A user may also set up a connection to a WPAN using for example the Bluetooth® specification. When one or more of these wireless networking options have been setup on a laptop, a location handler may be provided which, when executed, causes the laptop to search for a connection to the specified network, and to connect to that network once the network connection is found. A network connection may require logon authentication. The user may be prompted via the device user interface to enter the logon information. Alternatively, the logon information may be included as part of the location handler to automatically complete the logon to the specified network upon execution of the location handler.

In the example of a laptop (or computing device in a vehicle), the syntax of the location handler 126 for connecting to each type of wireless network (e.g., WWAN, WiMax, WLAN, WPAN, etc.) is known. The location handler 126 interacts with the Windows® operating system (or whatever operating system is running on the laptop) to accomplish the same effect had the user manually connected to the specified network using the device user interface.

Other types of mobile computing devices, such as PDAs and cellular telephones, may similarly include location handlers 126 which execute upon entry into a specified geographic zone to cause those devices to connect to a wireless network based on the location of the device. The actual syntax of the location handlers for connecting such devices to each type of wireless network is known, and would accomplish the same effect had the user manually connected to the specific network using the device user interface.

In each embodiment described above, the location handler 126 may automatically connect to the specified network upon entry into a new geographic zone. Alternatively, the location handler may provide an alert via the mobile device, providing the user with the option to connect to the specified network. It may happen that a desired network specified by a location handler may not be available upon an attempt to connect. In such an event, the location handler may specify other wireless networks to connect to in the event the primary network is unavailable.

Using location handlers 126 to connect to a specific wireless network based on location as described above may have several uses and benefits. For example, one geographic zone defined on map 124 may be that of a user's office. In such an embodiment, location handlers may be provided that automatically switch from using a WWAN to using a WLAN when a laptop moves from outside the user's office network area into the user's office network area (and vice-versa). A similar geographic zone and location handlers may be defined for the user's home (or other) WLAN network.

In a further embodiment, instead of switching between two different types of wireless networks (e.g., WWAN to WLAN, WLAN to WPAN, etc.), the present system may be used to automatically switch between two different wireless networks of the same type (e.g., a first WWAN to a second WWAN, a first WLAN to a second WLAN, etc.). For example, there may be a pair of wireless service provider operators, X and Y, each providing WWAN service. Operator X may offer a high bandwidth connection, such as HSDPA, in a first geographic zone and low bandwidth, such as GPRS, outside of that first geographic zone. Conversely, Operator Y may offer high bandwidth in the second geographic zone and low bandwidth outside of that second geographic zone. In this instance, the first and second geographic zones may be defined on map 124, and location handlers may be provided so that the user's mobile computing device 100 detects when the user is passing from the first to the second zone, and then either automatically switch from operator X to operator Y, or provide the user with an option to switch operators and use the higher bandwidth connection.

There may be instances where radio transmission on a particular frequency in a given geographic area is prohibited. Accordingly, in further embodiments of the present system, geographic zones where such restrictions exist may be defined on map 124, and location handlers 126 defined and associated with those geographic areas. Upon entry into such areas, the location handlers for those areas may execute and interact with the computing device's operating system in a known manner to turn off radio transmission on the designated frequencies, or turn off radio transmission altogether. The location handler may or may not specify that the radio transmission be restored upon leaving that geographic zone.

In a further aspect of the present system, geographic zones and associated location handlers 126 may be defined to control the multimedia properties of a mobile computing device 100. For example, location handlers may be provided on a mobile computing device which turn the volume of the device up, down, off or on upon entry into a defined geographic zone. Location handlers may be provided on a device which disable or enable the photo or video capture capabilities of the device for defined geographic zones. Location handlers 126 may be provided on a device which disable or enable the device display for defined geographic zones. The above-described location handlers may or may not specify the reverse action upon exiting a geographic zone. Location handlers 126 may also be provided on a device 100 which power down the device altogether upon entry into a defined geographic zone.

In further embodiment of the present system, geographic zones and associated location handlers 126 may be defined to change regional settings on a mobile computing device upon moving into a new region. For example, location handlers may be provided on a device to set the time, date, daylight savings, etc. on the device for different defined geographic zones.

As indicated above, each device may be customized with its own defined geographic zones and its own location handlers associated with the geographic zones. In embodiments, a plurality of mobile devices may share one or more, or exactly the same, geographic zones and location handlers. In embodiments, a plurality of mobile devices may have the same geographic zone, but the location handlers on a first mobile device (e.g., a first laptop) for that zone may be different than the location handlers on a second mobile device (e.g., a second laptop) for that zone. Similarly, a plurality of mobile devices may have the same geographic zone, but the location handlers on a first type of mobile device (e.g., a laptop) for that zone may be different than the location handlers on a second type of mobile device (e.g., a cellular phone) for that zone.

As indicated in FIG. 3, different defined geographic zones on map 124 may partially overlap, and as indicated in FIG. 4, a first zone may completely overlap so that a first zone is completely included or encompassed within a second zone. It may happen that the location handlers 126 for overlapping or encompassed zones are not in conflict with each other. In this situation, the location handlers for both zones may have been executed and are in effect while in the overlapping/encompassed area. However, it may happen that conflicts arise between location handlers for overlapping or encompassed zones. For example, referring to FIG. 3, a device may include location handlers associated with zone 132 which connect the device to a first network when in zone 132, and the device may include location handlers associated with zone 134 which connect the device to a second network when in zone 134. A conflict may therefore exist in the overlapping area of zones 132 and 134.

The present system may handle conflicts a number of ways. In an embodiment, a priority may be expressed in the location handlers of overlapping zones which indicates which location handler takes priority in conflict areas. The priority may be user-defined, or they may be based on a hierarchical weighting of the various wireless networks. In a further embodiment, the system may prompt the user over the device interface in the event of a conflict, and ask the user to select one location handler for execution. In a further embodiment, when there are conflicting location handlers, the priority may be set by an administrator using group policy. In a still further embodiment, where two or more zones overlap, the overlapping area may be treated as another, independent zone having its own location handlers. For example, in FIG. 3, the overlap area may be separated from zones 132 and 134 so that there are three independent and non-overlapping geographic zones: zone 132, zone 134 and the third zone defined by the intersection between zones 132 and 134. In such embodiments, each of the three zones may include its own set of location handlers, none of which being in conflict with the others as there are no overlapping areas.

As with the geographic map 124, location handlers 126 may be stored in memory on a mobile computing device. Alternatively, the geographic map and/or location handlers may be stored centrally on a server to which mobile devices may be network connected. In such an embodiment, upon entry into a geographic zone, the device may access the server, and then download and execute the location handlers for that zone. For example, in Windows® operating system devices, the location handlers may be associated with a group policy. Such an embodiment has an advantage of centralized management of devices, in that a network administrator may quickly and easily add, delete and/or modify one or more location handlers for a plurality of mobile computing devices. Policies may be set up so that different users of a given device (e.g., laptops) receive different location handlers, based on any number of criteria (seniority, security clearance, corporate group within the company, etc). Policies may also be set up so that different types of devices (e.g., laptops and PDAs) receive different location handlers.

Location handlers 126 may be set up via the user interface on the mobile computing device, or by an administrator using a different computing device. In one embodiment for defining location handlers, the user/administrator may be presented with a graphical user interface which allows the user/administrator to manually run through the steps to be performed by a location handler, and then have the instructions for carrying out those manual steps encoded into the location handler.

A further aspect of the present system involves a location handling engine 128 for determining when a new geographic zone has been entered and exited, and for executing and terminating location handlers accordingly. The location handling engine 128 may be stored in memory of the mobile computing device. A flowchart of the operation of an embodiment of the location handling engine 128 of the present system in a mobile computing device will now be explained with reference to FIG. 5.

Typically, the location handling engine initiates the execution of one or more location handlers upon the crossing of a border into or out of a geographical zone. However, it may happen that a user is first powering up his or her mobile computing device. Therefore, in a step 190, the location handling engine 128 first checks whether the device is initially being powered up. If so, the engine 128 queries the GPS unit to determine the current position of the device 100 in step 192. The engine 128 then compares that position against the geographic map in step 194 to determine whether the device 100 is currently within a defined geographic zone. If not, the engine continues to step 200 to get a new location of device as explained hereinafter with respect to step 200. On the other hand, if it is determined in step 194 that the device is currently within a defined geographic zone, the engine loops to step 208 to execute location handlers for that zone as explained hereinafter with respect to step 208.

If the mobile device has not just powered up in step 190, the engine 128 performs a step 200 of periodically receiving a new location of the mobile computing device (for example once every second, though the period may be shorter or longer than that in alternative embodiments). APIs may be provided for communication between the location handling engine 128 and the GPS chipset, or other location identification system included on or associated with the mobile computing device.

In step 202, the engine 128 maps the new location, $L_{new}$, of the device to the geographic zones on map 124. In step 204, the vector path of travel of the device is determined using the present location of the device and the location of the device at the prior point in time, $L_{old}$, when location was last measured. For example, where the position $L_{old}$ is expressed as a two dimensional coordinate (a, b), and $L_{new}$=(c, d), then the line, L, between the old and new locations may be determined by the equation:

$$L=(x-a)*(b-d)+(y-b)*(c-a)=0. \quad (1)$$

A 2-dimensional coordinate system is used for illustration. However, those of skill will appreciate that the above may be expanded to encompass higher dimensional coordinate systems. The distance from $L_{old}$ to $L_{new}$ may be obtained by the equation sqrt((a−c)^2+(b−d)^2), using the values of $L_{old}$ and $L_{new}$ used above. Other methods may be employed for determining the vector travel of the device 100 from $L_{old}$ to $L_{new}$.

In step 206, the engine 128 determines whether the path of travel of the device from $L_{old}$ to $L_{new}$ has crossed over a boundary of a geographic zone. In particular, the vertices of the geographic zones described above define a plurality of edges for each geographic zone. For example, where two adjacent coordinates, $(x_1, y_1)$ and $(x_2, y_2)$, define an edge, E, of a geographic zone, the edge E may be expressed in a form similar to Equation (1) from the preceding paragraph:

$$E=(x-x_1)*(y_1-y_2)+(y-y_1)*(x_2-x_1)=0.$$

The engine 128 may then determine whether the path of travel of the device has crossed over (intersected with) any of the edges of the geographic zones. In particular, the line, L, representing the path of travel of the device may intersect and cross over the edge, E, of a geographic zone at an intersection point P=(px, py), given by:

$$(px-a)*(b-d)+(py-b)*(c-a)=0;\text{ and}$$

$$(px-x_1)*(y_1-y_2)+(py-y_1)*(x_2-x_1)=0.$$

Such an intersection point P of line L and edge E exists (it will not exist where P and E are parallel to each other), if the following conditions are true:

$$\text{the distance}(L_{new}, L_{old})=\text{distance}(L_{new}, P)+\text{distance}(P, L_{old});\text{ and}$$

$$\text{the distance}(E1, E2)=\text{distance}(E1, P)+\text{distance}(P, E2),$$

where E1 and E2 are the endpoints $(x_1, y_1)$ and $(x_2, y_2)$ of the edge E. It is understood that there are other methods for determining whether a mobile computing device 100 crosses over an edge of a geographic zone.

If it is determined in step 206 that no boundary has been crossed, the engine 128 returns to step 200 to retrieve a new location of the device. On the other hand, if it is determined in step 206 that a boundary has been crossed, the engine 128 identifies the zone into which the device has crossed in step 208, and the engine 128 identifies the set of location handlers $S_{new}$ for that zone. In step 210, the engine 128 executes the location handlers in $S_{new}$. As explained above, the location handlers may interact with a device's operating system to initiate, terminate and/or alter any of a variety of system settings on the device.

In step 212, the engine 128 may identify the set of location handlers $S_{old}$ from $L_{old}$ that may need to be terminated. As indicated above, geographic zones may overlap, and, in embodiments, entry into a new zone does not necessarily imply that an old zone has been left. Thus, in embodiments, in addition to checking whether the boundary of a new zone has been crossed as described above, the engine 128 may also check whether a boundary of an old zone has been crossed in a similar fashion. In embodiments where all overlapping zones are redefined into a group of non-overlapping zones as described above, crossing over a boundary would in fact mean that an old zone has been exited. Where it is determined that an old zone has been left, the location handlers for that old zone may be stopped or reversed in step 214.

As indicated above, the location handling engine 128 may be located in memory of the mobile computing device 100. In an alternative embodiment, the location handling engine may be stored remotely from device 100, such as for example on a central server. This central server may also store the location handlers 126. In such an embodiment, the mobile computing device 100 may periodically determine its location as explained above, and then send the location information to the central server. The central server would then look up a map (on the central server or elsewhere) and determine if any location handlers for the querying mobile computing device need to be invoked. If any handlers need to be invoked, the central server may send those location handlers to the mobile computing device for execution.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer implemented method of controlling system settings of a plurality of mobile computing devices based on locations of the devices, comprising the steps of:
    (a) receiving one or more defined geographic zones for each mobile computing device of the plurality of mobile computing devices, the one or more geographic zones for a first mobile computing device capable of being different than the one or more geographic zones for a second mobile computing device and the one or more defined geographic zones for the first mobile computing device includes:
        a first geographic zone having a first set of system settings associated therewith for the first mobile computing device, the first geographic zone capable of being uniquely created for the first mobile computing device, and
        a second geographic zone having a second set of system settings associated therewith for the first mobile computing device, the second set of system settings being different than the first set of system settings, the second geographic zone capable of being uniquely created for the first mobile computing device, the second geographic zone being different than and overlapping with the first geographic zone;
    (b) determining when the first mobile computing device crosses a boundary of a geographic zone received in said step (a) associated with the first mobile computing device; and
    (c) altering the system setting of the first mobile computing device upon crossing the boundary of the geographic zone in said step (b).

2. A method as recited in claim 1, wherein said step (a) of receiving one or more defined geographic zones comprises the step of receiving a plurality of coordinates, the coordinates defining a shape of the one or more geographic zones.

3. A method as recited in claim 1, wherein said step (c) of altering a system setting of the first mobile computing device comprises the step of connecting to one of a WWAN, a WiMax network, a WLAN and a WPAN.

4. A method as recited in claim 1, wherein two mobile computing devices of the plurality of mobile computing devices share a common defined geographic zone, but the system settings which are altered upon entering the shared geographic zone are different for the two mobile computing devices.

5. A method as recited in claim 1, wherein said step (c) of altering a system setting of the mobile computing device comprises the step of altering a multimedia property of the device.

6. A method as recited in claim 1, wherein said step (c) of altering a system setting of the mobile computing device comprises the step of powering down the device.

7. A method as recited in claim 1, further comprising the step of storing the instruction within memory of the mobile computing device prior to said step (b) of determining when the mobile computing device crosses a boundary of a geographic zone.

8. A method as recited in claim 1, further comprising the step of receiving the instruction within memory of the mobile computing device after said step (b) of determining when the mobile computing device crosses a boundary of a geographic zone.

9. A computer implemented method of controlling a behavior of a plurality of mobile computing devices based on a location of the devices, comprising the steps of:
- (a) defining one or more geographic zones for each mobile computing device of the plurality of mobile computing devices, the one or more geographic zones for a first mobile computing device capable of being different than the one or more geographic zones for a second mobile computing device and the one or more defined geographic zones for the first mobile computing device includes:
  - a first geographic zone having a first set of system settings associated therewith for the first mobile computing device, the first geographic zone capable of being uniquely created for the first mobile computing device, and
  - a second geographic zone having a second set of system settings associated therewith for the first mobile computing device, the second set of system settings being different than the first set of system settings, the second geographic zone capable of being uniquely created for the first mobile computing device, the second geographic zone being different than and completely contained within the first geographic zone;
- (b) defining one or more location handlers, associated with the one or more geographic zones for each mobile computing device, the one or more location handlers capable of altering one or more system settings of mobile computing devices of the plurality of mobile computing devices in different ways;
- (c) storing the one or more location handlers defined in said step (a) in a memory location accessible by the plurality of mobile computing devices;
- (d) receiving a request to receive the one or more location handlers from a mobile computing device of the plurality of mobile computing devices upon the mobile computing device crossing a boundary of the geographic zone with which the one or more location handlers are associated; and
- (e) forwarding the one or more location handlers requested in said step (c) to alter the one or more system settings of the requesting mobile computing device.

10. A method as recited in claim 9, further comprising the step of categorizing the one or more location handlers so that a first set of mobile computing devices receive a first set of location handlers upon a request in said step (d), and second set of mobile computing devices receive a second set of location handlers upon a request in said step (d).

11. A method as recited in claim 10, wherein said step of categorizing the one or more location handlers comprises the step of categorizing the one or more handlers according to a group policy set up for the plurality of mobile computing devices.

12. A method as recited in claim 10, wherein the first set of mobile computing devices are laptops and the second set of mobile computing devices are laptops.

13. A method as recited in claim 10, wherein the first and second sets of mobile computing devices are two different types of mobile computing devices from a group of mobile computing devices including laptops, personal digital assistants, cellular telephones and computing devices incorporated into vehicles.

14. A method as recited in claim 9, wherein said step (b) of defining one or more location handlers for altering one or more system settings of the plurality of mobile computing devices comprises the step of defining a software instruction for interacting with an operating system of a mobile computing device to cause the mobile computing device to disconnect from a first wireless network and connect to a second wireless network.

15. A method as recited in claim 9, wherein said step (b) of defining one or more location handlers for altering one or more system settings of the plurality of mobile computing devices comprises the step of defining a software instruction for interacting with an operating system of a mobile computing device to cause a change in a multimedia setting of the mobile computing device.

* * * * *